United States Patent [19]

Frank

[11] Patent Number: 4,864,895

[45] Date of Patent: Sep. 12, 1989

[54] METHOD AND APPARATUS FOR ADJUSTING THE TRUE RUNNING OF THE CUTTING EDGE OF ANNULAR SAW BLADES

[75] Inventor: Walter Frank, Burgkirchen, Fed. Rep. of Germany

[73] Assignee: Wacker-Chemitronic Gesellschaft fur Elektronik-Grundstoff mbH, Burghausen, Fed. Rep. of Germany

[21] Appl. No.: 216,356

[22] Filed: Jul. 7, 1988

[30] Foreign Application Priority Data

Jul. 14, 1987 [DE] Fed. Rep. of Germany ....... 3723252

[51] Int. Cl.⁴ .............................................. B28D 1/04
[52] U.S. Cl. ..................................... 76/25 R; 76/112; 125/15
[58] Field of Search ......................... 76/25 R, 27, 112; 29/446; 125/15; 51/73 R

[56] References Cited

U.S. PATENT DOCUMENTS 3,039,235  6/1962  Heinrich .................................. 51/73
3,175,548  3/1965  Weiss ...................................... 51/73
4,498,449  2/1985  Kachajian .............................. 125/15
4,567,798  2/1986  Brdicko ................................. 125/15

FOREIGN PATENT DOCUMENTS 2841653  5/1979  Fed. Rep. of Germany ........ 125/15

Primary Examiner—Roscoe V. Parker
Attorney, Agent, or Firm—Collard, Roe & Galgano

[57] ABSTRACT

A method to be used for adjusting the radial deviation from the true running position of the internal cutting edge of annular saw blades and an apparatus for carrying out the method. For this purpose, the radial deviation or out-of-true is first measured as a function of position. Subsequently, the saw blade is stretched as a function of position in a defined manner in order to compensate for the deviations from the specified value of the radial out-of-true as a function of position. The measuring and tensioning cycles are continued until the deviation from the specified value no longer exceeds a predetermined tolerance limit. Saw blades adjusted in this manner are characterized by long service lives and high cutting accuracy.

6 Claims, 2 Drawing Sheets

METHOD AND APPARATUS FOR ADJUSTING THE TRUE RUNNING OF THE CUTTING EDGE OF ANNULAR SAW BLADES

BACKGROUND OF THE INVENTION

1. Field of the Invention

The invention relates to a method and apparatus for adjusting the true running path of the cutting edge of annular saw blades by exerting tensional forces thereon. More particularly, the adjustment method uses tensioning elements acting on the outer edge region of the saw blade to make sure the blade runs true.

2. Description of the Prior Art

For cutting thin slices or wafers from rod-type or block-type workpieces composed of semiconductors or oxidic materials such as, for example, silicon, germanium, gallium arsenide, gallium-gadolinium-garnet, sapphire or quartz, use is mainly made of internal-hole or annular saws. In annular saws, the saw blades are clamped in a holder at their outer edge. The inner edge of the saw blade is generally coated with a nickel-diamond coating and represents the actual cutting edge which removes material in the cutting process. At the same time, alignment of the saw blade to insure true running, in particular of the cutting edge, can be effected in the radial direction by means of the tensional forces exerted in the outer edge region on the saw blade. Suitable tensioning devices are described, for example, in German Patent specification Nos. 3,442,730 and 2,841,653, and U.S. Pat. Nos. 3,175,548 and 3,039,235.

It has long been known that it is very important to control the radial true running of the cutting edge as precisely as possible, and consequently the tensioning of the saw blade. On the one hand, this has a decisive effect on the cutting accuracy, and on the other hand, also on the service life of the saw blade. Normally, the saw blades are carefully clamped by hand, and the adjustment of the radial true running of the cutting edge ultimately depends on the manual skill of the operator concerned and is accordingly subject to the variations.

SUMMARY OF THE INVENTION

It is an object of the invention to provide a method and apparatus by which the true running of the cutting edge of annular saw blades can be adjusted in a reproducible manner with great accuracy.

It is yet another object of the invention to provide a method and apparatus in which the deviation from the true running path of an annular saw blade can be continually measured and automatically readjusted until a predetermined deviation is obtained.

Accordingly, these objects are achieved by a method wherein the following steps are followed:

(a) the saw blade is mounted either without being tensioned or by being pre-tensioned, in the holder designed to receive it;

(b) the radial deviation from the true cutting edge is measured as a function of position;

(c) using the tensioning elements, the saw blade is stretched in a defined manner as a function of position in proportion to the radial deviation from the true found;

(d) steps b) and c) are repeated until the measured radial deviation from the true cutting edge meets the specified value.

In the first step of the method, the saw blade is mounted in the usual holder designed to receive it in the same manner as in the manual tensioning method. No tensional forces, but only holding forces are as yet acting on its outer region. As a rule, the saw blade is held by holding rings or clamping rings, for example, frictionally, in the initial position. The holder is, in turn, mounted in general directly on the drive drum which usually has an expanding beaker-type shape and can be rotated via a drive unit. In principle, however, it is also possible to initially pre-tension the saw blade.

Sensors are provided for measuring the radial deviations from the true cutting path of the cutting edge or for determining the deviation from the ideal running in the form of a circle surrounding the axis of rotation of the drive drum as center point. These sensors are sufficiently accurate so that assessments within the desired order of magnitude of a few thousandths of a millimeter are possible. Such sensors are commercially available and may operate, for example, on the basis of mechanical or optical measurement. The use of eddy-current measuring apparatuses have also proven successful. These devices induce eddy currents, for example, in the region of the saw blade or the cutting edge to be measured and, from changes thereof, conclusions can be drawn about the true running of the blade. Particularly good results are achieved with double sensor systems which are arranged on both sides of the cutting edge and which sense the true running electronically.

The various values of the annular hole radius thus determined are additionally correlated in each case with the corresponding positions on the saw blade, for example by measuring the associated angle of rotation with respect to a certain reference point. For this purpose, for example, in the case of a fixed-position sensor, the saw blade can be rotated in a defined manner, with a stationary saw blade, and the sensor can be moved in a defined manner on a circular path.

According to a variant of the method, the actual tensioning operation is started in the region in which the pairs of values (radius/position) obtained have a minimum value for the radius. In this region, therefore, the greatest stretching of the saw blade is required in order to achieve a satisfactory true running of the cutting edge. The tensioning can then be carried out in accordance with the available tensioning system, for example, by systematically tightening the tensioning screws or by systematically applying hydraulic or pneumatic pressure.

Other objects and features of the present invention will become apparent from the following detailed description considered in connection with the accompanying drawing, which discloses one embodiment of the invention. It is to be understood that the drawing is to be used for the purpose of illustration only, and not as a definition of the limits of the invention.

BRIEF DESCRIPTION OF THE DRAWING

In the drawing, wherein similar reference characters denote similar elements throughout the view.

DESCRIPTION OF THE PREFERRED EMBODIMENT

Figure 1:
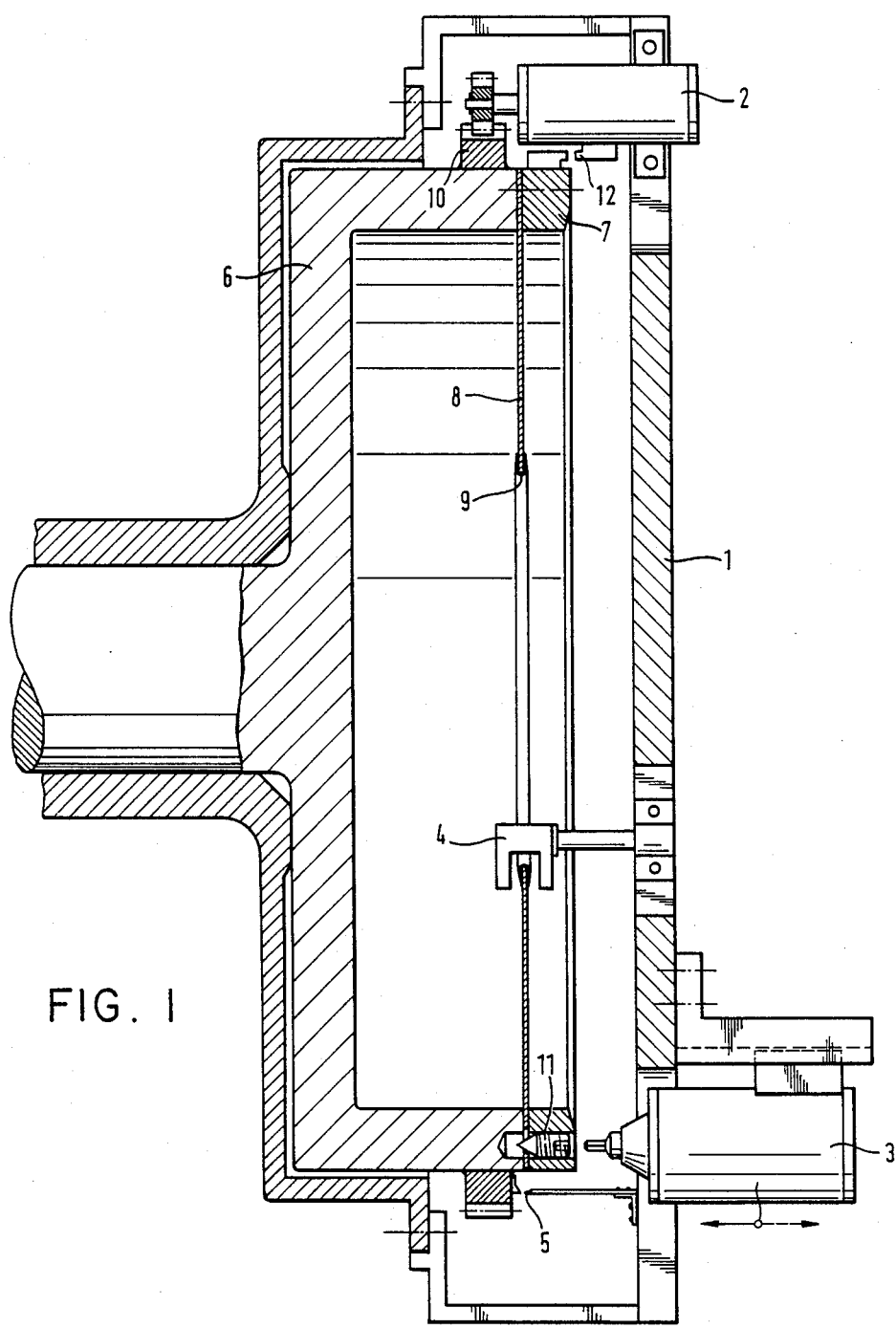
FIG. 1 shows a schematic side view of the tensioning apparatus of the present invention utilizing a screw tensioning system.
Figure 2:
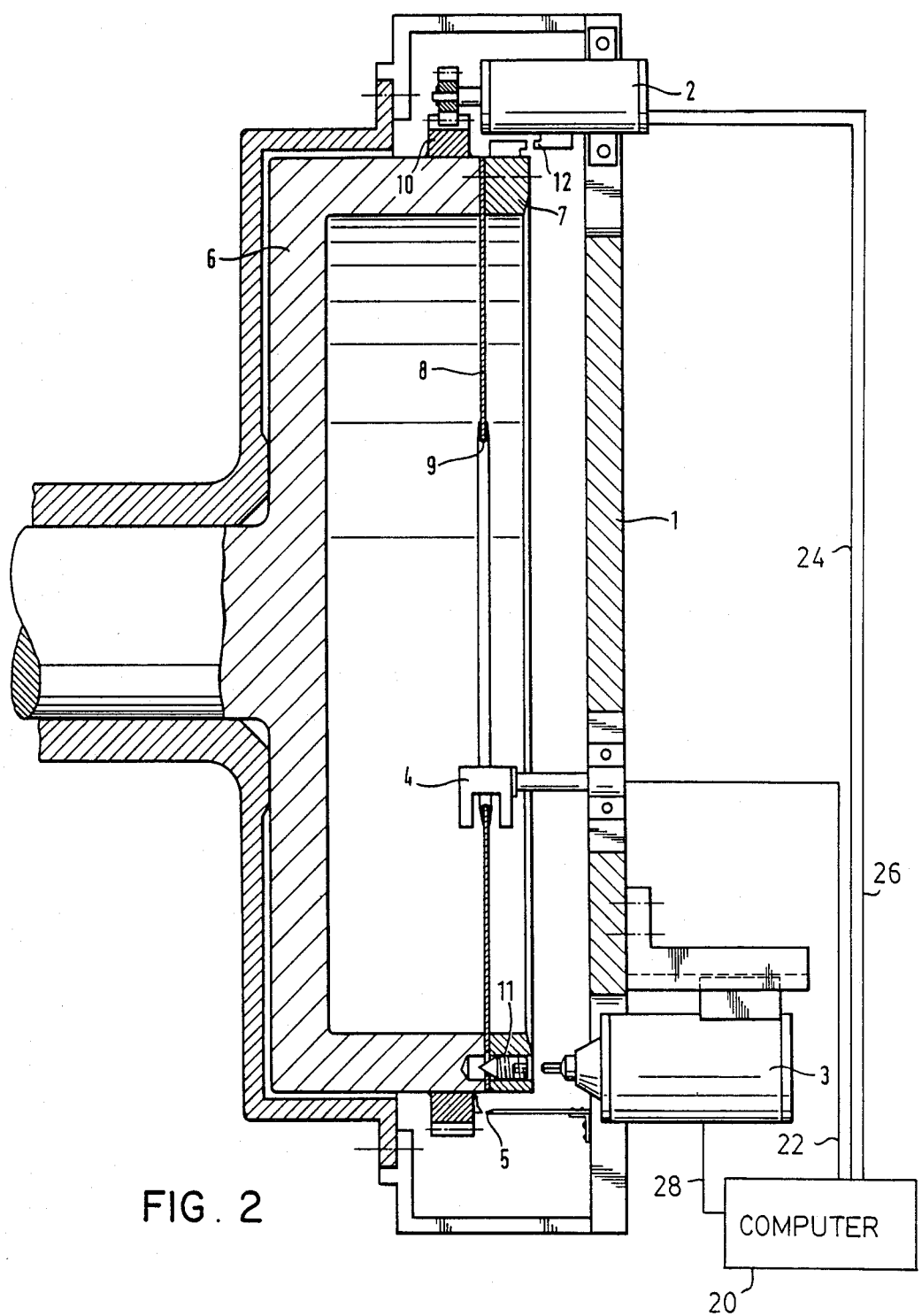
FIG. 2 shows a schematic side view of the tensioning apparatus including the computer.

Referring to the figure, there is shown schematically a possible device for carrying out the method of adjustment with a screw tensioning system. It is composed for example, of either a round, square, rectangular or polygonal carrier or base plate 1 on which is mounted at least one drive. A positioning motor 2 is provided which effects a systematic rotation of the tensioning system for the saw blade 8. Also, at least one drive or tensioning motor 3 is provided which effects a systematic rotation of the tensioning screws, the two drives expediently being designed as stepping motors. Tensioning motor 3 may be movably mounted so that it may selectively engage and disengage from the tensioning screws.

A test apparatus 4 could be provided to test the true running of saw blade 8; for example, a double sensor system arranged on both sides of the cutting edge and at the level of the cutting-edge region could be used. This embodiment with a fixed measuring system is not mandatory. Separate rotatable measuring systems are also conceivable. The drive drum 6, the tensioning frame 7, saw blade 8, and also the cutting edge 9 of saw blade 8 are only shown diagramatically.

Preferably, the elements mentioned are adjustably arranged on base plate 1 in order to be able to process saw blades and tensioning frames of different external dimensions and annular hole diameters. In order to ensure a reproducible working position of carrier plate 1 relative to saw blade 8 to be adjusted, tensioning frame 7 and cutting edge 9, where several tensioning operations and different tensioning frames are used, are provided with at least one reference point 5. Reference point 5 is always placed in a predetermined position with respect to a corresponding counterpiece on the workpiece to be adjusted. Examples of reference points suitable for this purpose are markings (which have to be brought to coincidence or set by means of adjustment gauges), pegs or peg holes to be inserted in each other, or the like.

The actual tensioning operation may, for example, proceed in a manner such that the tensioning device, which may be constructed in accordance with the figure, is first brought into the working position relative to tensioning frame 7 containing saw blade 8. While saw blade 8 is inserted, it is not yet tensioned or is only pre-tensioned, and is aligned in relation to the reference point(s) 5 provided. In this connection, the tensioning device may be mounted directly on the saw assembly or may be brought to the working position by means of an external positioning device and held there.

A first rotation of the saw blade to be adjusted is now carried out by means of positioning motor 2 which engages, for example, by means of a gear mounted thereon and a gear rim 10 mounted on the saw blade holding system or on the drive drum. In this connection, rim 10 may advantageously, for example, be slipped onto or screwed onto the saw blade holding system only for the adjustment operation, but may also be permanently mounted. Another possibility, which is advantageous because of its relatively low cost, is to equip the positioning motor 2 with a friction wheel which can engage, for example, on the outside circumference of the drive drum and effect the rotation.

During the rotation, a computer 20 correlates the radius values measured by means of measuring apparatus 4 and inputted via input line 22 with the position values which can be measured, for example, via the angle of rotation of positioning motor 2 and inputed via input line 24 and stores them. Expediently, the tensioning element which in this embodiment of the invention is tensioning screw 11, situated nearest the point with the minimum hole radius, or the largest radial deviation of the cutting edge from the specified value, is then presented to tensioning motor 3 by means of positioning motor 2 controlled by output line 26. To facilitate this positioning, according to one embodiment of the invention, an additional marking 12 is provided, for example, in the form of a proximity switch by means of which the position of positioning motor 2 in relation to the tensioning elements can be determined and reproduced.

After the tensioning screw 11 has stopped at the tensioning motor 3, the latter is removed into engagement with screw 11, carries out the tensioning operation by a defined rotation of the tensioning screw 11 controlled by computer 20 via output line 28, and returns again to the initial position out of engagement with screw 11. The positioning motor 2 can now be used to index the next tensioning screw 11 into position, which screw is again tightened by means of the tensioning motor 3 in a defined manner. At the same time, during this first phase of the tensioning operation, no tensioning forces need as yet be applied to the saw blade in the region of the maximum hole radius.

Expediently, the maximum possible screw rotation during a tensioning operation is limited by the tensioning motor, advantageously to 0.25 to 1.0 revolutions, in order to prevent a sectional overstretching of the saw blade, and smaller steps may also be advantageously towards the end of the tensioning operation. The screw rotation necessary in each case to compensate for the deviation from the specified value is advantageously controlled by means of computer 20 in accordance with the tensioning system and the saw blade used. The corresponding standard values are expediently determined in preliminary experiments and stored in the computer.

In some cases, it may also be necessary, because of the limitation of the number of revolutions of the tensioning motor, to allow the first phase of the tensioning operation to proceed in several cycles, for example, if the difference between the maximum and the minimum annular hole radius exceeds a certain limit value which is typically due to the apparatus.

This first phase in which the true running of the cutting edge is usually adjusted to a deviation from the specified value in the range of about 0.03 mm is then followed by the actual tensioning phase. In this case, a tension is applied to the saw blade via all the tensioning screws 11. For example, in a first tensioning cycle, all the screws may be first tightened with a certain constant angle of rotation in order to produce a certain basic tension in the saw blade. Subsequently, the true running of the cutting edge is checked as a function of position during a measurement cycle and stored. In a subsequent correction cycle, which is generally necessary, the cutting edge is pulled outwardly by suitably increasing the tensioning force on the saw blade. These forces are controlled through systematic, computer-controlled further rotation of the tensioning screws 11 in regions in which the hole radius is less than the maximum value found. The result is then checked and measured as a function of position in a further measuring cycle. In some cases, further correction and measuring cycles are then run until the true running (radial out-of-true) of the cutting edge is within the desired tolerance range, usually 0.01 mm.

In many cases, it is also possible to insert a measuring and correction cycle only after several tensioning cycles. In a further development of the inventive concept, provision is made for allowing tensioning and correction cycles to proceed in parallel by constantly aligning the specified and actual values for the true running of the cutting edge. This variation is particularly useful when only a short time is available for adjusting the cutting edge.

Compared with saw blades having a cutting edge adjusted by the conventional manual method, saw blades having a cutting edge adjusted by means of the method according to the invention have a markedly increased service life and improved cutting performance, especially in relation to the geometry of the wafers obtained.

While only one embodiment of the present invention has been described, it is obvious that many changes and modifications may be made thereunto, without departing from the spirit and scope of the invention.

What is claimed is:

1. A method for adjusting the running position of the cutting edge of an annular saw blade of a saw by exerting tensional forces by means of a plurality of tensioning elements acting in the outer edge region of the saw blade to bring the actual saw blade running position in line with a true running position, comprising the steps of:
   (a) mounting the annular saw blade in a holder in the saw;
   (b) measuring the radial deviation of the actual running position of the cutting edge of the saw blade from the true running position as a function of circumferential position around the saw blade;
   (c) comparing said measured radial deviation from the true running position with a predetermined value via computer means;
   (d) tensioning the tensioning elements acting in the outer edge region of the saw blade to stretch the annular saw blade in a defined manner as a function of said circumferential position in proportion to the radial deviation from the predetermined value via computer means; and
   (e) repeating steps (b) through (d) until the measured radial deviation from the true running position of the cutting edge is less than the predetermined value.

2. The method as claimed in claim 1, wherein the step of tensioning the tensioning elements is carried out through the action of at least one stepping motor engageable with the tensioning elements.

3. The method as claimed in claim 1, wherein the step of measuring the radial deviation from the true running position of the cutting edge is by means of sensors located adjacent to each side of the saw blade.

4. The method as claimed in claim 1, wherein the step of tensioning the tensioning elements is started at the tensioning element in the circumferential position where the cutting edge has the smallest radius.

5. An apparatus for adjusting the actual running position of the internal cutting edge of an annular saw blade with respect to a true running position thereof by applying tensional force in an outer edge of the annular saw blade, comprising:
   a holder for supporting a peripheral edge of the annular saw blade;
   a plurality of adjustable tensioning elements mounted on said holder at predetermined intervals thereon around the peripheral edge of the saw blade and operatively coupled to the saw blade for applying tensional forces thereto;
   a carrier plate mounted adjacent to said holder;
   a sensor for sensing the deviation of the actual running position of the cutting edge from the true running position as a function of circumferential position, said sensor attached to said carrier plate and extending outwardly thereof into an internal hole of said annular saw blade adjacent to said internal cutting edge;
   means for producing a relative rotational movement between said sensor and said internal cutting edge;
   means for selectively adjusting each of said plurality of adjustable tensioning elements; and
   computer means for comparing said sensed deviation of the actual running position of said cutting edge from the true running position as a function of circumferential position to a predetermined deviation, said computer means actuating said means for selectively adjusting each of said plurality of tensioning elements to apply the tensional forces in the outer edge of the saw blade to adjust the deviation of the actual running position of the internal cutting edge of the saw blade from the true running position to less than said predetermined deviation.

6. A method for adjusting the actual running position of the internal cutting edge of an annular saw blade towards a true running position by exerting tensional forces by means of a plurality of tensioning elements acting on and positioned around the outer periphery of the saw blade, comprising the steps of:
   mounting the annular saw blade in a holder in a saw;
   mounting a sensor within a hole of the annular saw blade;
   pre-tensioning the tensioning elements to produce a predetermined pre-tensioning;
   causing a relative rotation between the internal cutting edge of the annular saw blade and the sensor;
   measuring the radial deviation of the actual running position of the cutting edge from a true running position of the cutting edge with said sensor as a function of circumferential position around the outer periphery of the saw blade;
   selectively tensioning said tensioning elements as a function of their circumferential position around the outer periphery of the saw blade to produce tensional forces in response to said measured deviation; and
   remeasuring the actual deviation of the cutting edge from the true running position and selectively re-tensioning said tensioning elements until the measured radial deviation of the actual running position from the true running position is less than a predetermined radial deviation.

* * * * *